US006976317B2

(12) United States Patent
Rodi

(10) Patent No.: US 6,976,317 B2
(45) Date of Patent: Dec. 20, 2005

(54) MEASURING SYSTEM FOR RECORDING ANGULAR AND LINEAR ABSOLUTE VALUES

(76) Inventor: Anton Rodi, Paul-Ehrlich-Strasse 1, D-69181 Leimen (DE)

(*) Notice: Subject to any disclaimer, the term of this patent is extended or adjusted under 35 U.S.C. 154(b) by 0 days.

(21) Appl. No.: 10/804,151

(22) Filed: Mar. 17, 2004

(65) Prior Publication Data

US 2004/0181958 A1 Sep. 23, 2004

(30) Foreign Application Priority Data

Mar. 18, 2003 (DE) ................................ 103 12 045

(51) Int. Cl.[7] ................................ D26D 7/28

(52) U.S. Cl. ................................ 33/706; 33/708

(58) Field of Search ................................ 33/706, 707, 708, 33/761, 762, 763, 755, 1 N, 1 PT, 772, 773

(56) References Cited

U.S. PATENT DOCUMENTS

| | | | | | |
|---|---|---|---|---|---|
| 3,833,299 | A | | 9/1974 | Lang | |
| 4,164,816 | A | * | 8/1979 | Bergkvist | 33/762 |
| 4,316,081 | A | * | 2/1982 | Washizuka et al. | 33/762 |
| 4,479,716 | A | * | 10/1984 | Nelle | 33/707 |
| 4,529,964 | A | * | 7/1985 | Minami et al. | 33/707 |
| 4,551,847 | A | * | 11/1985 | Caldwell | 33/755 |
| 4,612,267 | A | | 9/1986 | Heitmann et al. | |
| 4,700,062 | A | | 10/1987 | Ernst | |
| 5,044,089 | A | * | 9/1991 | Petkovic et al. | 33/755 |
| 5,060,394 | A | * | 10/1991 | Lincoln et al. | 33/763 |
| 5,286,972 | A | * | 2/1994 | Falk et al. | 33/763 |
| 5,471,761 | A | * | 12/1995 | Cheng | 33/761 |
| 5,894,678 | A | * | 4/1999 | Masreliez et al. | 33/762 |
| 5,901,458 | A | * | 5/1999 | Andermo et al. | 33/708 |
| 6,029,118 | A | * | 2/2000 | Strasser | 33/706 |
| 6,163,970 | A | * | 12/2000 | Nelle et al. | 33/706 |
| 2002/0144423 | A1 | | 10/2002 | Rodi | |
| 2002/0170200 | A1 | | 11/2002 | Rodi | |

FOREIGN PATENT DOCUMENTS

| | | | |
|---|---|---|---|
| DE | 21 63 200 | C2 | 8/1973 |
| DE | 34 18 854 | A1 | 11/1985 |
| DE | 34 29 648 | C2 | 2/1986 |
| DE | 42 29 610 | A1 | 6/1993 |
| DE | 101 11 399 | C1 | 5/2002 |
| DE | 101 09 184 | A1 | 8/2002 |
| DE | 101 09 185 | A1 | 8/2002 |
| DE | 101 17 193 | A1 | 10/2002 |

(Continued)

*Primary Examiner*—Christopher W. Fulton
*Assistant Examiner*—Travis Reis
(74) *Attorney, Agent, or Firm*—Laurence A. Greenberg; Werner H. Stemer; Ralph E. Locher

(57) ABSTRACT

A measuring system for recording angular and linear absolute values has a scale with a measuring track to create the absolute value that is recorded by a sensor configuration. The scale is composed of at least two segments configured in the same way to record absolute values. The scale has at least one track suitable for determining the absolute value of each segment reached using the sensor configuration. The measuring system contains switches that provide the total absolute value for further processing made up of the absolute value of the segment and the calculated absolute value within the segment. The system is supplied by a main power supply. There is also a switch configuration that switches to auxiliary power when the main power fails and the sensor configuration is only used in this operating mode to determine the absolute value of the particular segment reached.

16 Claims, 3 Drawing Sheets

FOREIGN PATENT DOCUMENTS

DE 102 30 471 A1 1/2004
EP 0 466 209 A2 1/1992

* cited by examiner

| | Main Power | | | Auxiliary Power | | |
|---|---|---|---|---|---|---|
| | $X_1$ | $X_2$ | $X_3$ | $X_1$ | $X_2$ | $X_3$ |
| S1 + S2 | 1 | 0 | 1 | 0 | 0 | 1 |
| S1 | 1 | 1 | 0 | 1 | 1 | 0 |
| S2 | 0 | 1 | 1 | 0 | 0 | 1 |

| | | Main Voltage | | | | Auxiliary Voltage | | | |
|---|---|---|---|---|---|---|---|---|---|
| | | $X_1$ | $X_2$ | $X_3$ | $X_4$ | $X_1$ | $X_2$ | $X_3$ | $X_4$ |
| Partial Active Redundancy (1/0)* | $S_1$ | 1 | -/(1)* | 0 | - | 0 | -/(0)* | 1 | - |
| | $S_2$ | -/(1)* | 1 | - | 0 | -(0)* | 0 | - | 1 |
| Passive Redundancy ($S_{1,2}$) | $S_1$ ($S_2$) | 1 | 0/(1)* | 0 | 0 | 0 | 0/(0)* | 1 | 0 |
| | $S_2$ ($S_1$) | 0/(1)* | 1 | 0 | 0 | 0/(0)* | 0 | 0 | 1 |

| | Main Voltage $X_1$ | Main Voltage $X_2$ | Main Voltage $X_3$ | Main Voltage $X_4$ | Auxiliary Voltage $X_1$ | Auxiliary Voltage $X_2$ | Auxiliary Voltage $X_3$ | Auxiliary Voltage $X_4$ |
|---|---|---|---|---|---|---|---|---|
| Partial Active Redundancy (1/0)* $S_1$ | 1 | -/(1)* | 0 | - | 0 | -/(0)* | 1 | - |
| Partial Active Redundancy (1/0)* $S_2$ | -/(1)* | 1 | - | 0 | -(0)* | 0 | - | 1 |
| Passive Redundancy ($S_{1,2}$) $S_1$ ($S_2$) | 1 | 0/(1)* | 0 | 0 | 0 | 0/(0)* | 1 | 0 |
| Passive Redundancy ($S_{1,2}$) $S_2$ ($S_1$) | 0/(1)* | 1 | 0 | 0 | 0/(0)* | 0 | 0 | 1 |

MEASURING SYSTEM FOR RECORDING ANGULAR AND LINEAR ABSOLUTE VALUES

BACKGROUND OF THE INVENTION

Field of the Invention

The present invention relates to a measuring system for recording angular and linear absolute values. The measuring system has a scale with a measuring track for creating the absolute value, which is recorded by a sensor configuration. The scale is composed of at least two segments configured in the same way to record absolute values and where the scale has at least one track suitable for determining the absolute value of each segment reached using the sensor configuration. The measuring system contains switches that provide the total absolute value for further processing made up of the absolute value of the segment and the calculated absolute value within the segment.

A linear measuring system of this type is described in my earlier Published, Non-Prosecuted German Patent Application No. DE 101 17 193.5, corresponding to U.S. Patent Publication Nos. 20020170200 and 20020144423; the prior applications are herewith incorporated by reference in their entirety.

SUMMARY OF THE INVENTION

It is accordingly an object of the invention to provide a measuring system for recording angular and linear absolute values which overcomes the above-mentioned disadvantages of the prior art devices of this general type, in which a complete loss of the measured value during a power failure is avoided.

With the foregoing and other objects in view there is provided, in accordance with the invention, a measuring system for recording angular and linear absolute values. The measuring system contains a scale that has at least one track for creating the absolute values. The track has at least two identically configured segments. A sensor configuration is provided for measuring and recording the absolute values of each of the segments reached. A switch configuration is connected to the sensor configuration and provides a total absolute value for further processing made up of a first absolute value of the segments counted and a second absolute value of a position within a particular segment reached. A power supply supplies a main voltage and an auxiliary voltage. The switch configuration has switches connected to the power supply and switches through the auxiliary voltage when the main voltage fails in an auxiliary power mode and the sensor configuration is only used in the auxiliary power mode to determine an absolute value of the particular segment reached.

Using the method described in the invention the auxiliary power operates with much lower power consumption so that a small battery, for example, is a sufficient source of auxiliary power for a long operating time. Nevertheless, the location of the sensor configuration in a particular segment is permanently recorded so that the exact position of the sensor configuration can be immediately redisplayed without any special input when the main power is restored. Furthermore, the permanent presence of auxiliary power allows the simple and cost-effective use of integratable RAM memory devices with very low power consumption and these can also be written to and read from as often as required.

Evaluation may involve the use of just one sensor with which both partial values i.e. both of the segment itself as well as the absolute position within the segment may be recorded. However, two separate sensors may also be used with which both tracks of the scale (segment measuring track and a suitable track for counting the segments) are recorded separately. German Patent Application DE 102 30 471.8, corresponding to U.S. Patent Publication Nos. 20020170200 and 20020144423, explains that this suitable track may also be the segment measuring track or even a part of the absolute measuring track and therefore does not necessarily have to be a special track.

However, there is also an advantage in using the absolute measuring system where the measured object itself does not have any specially applied markers but does contain a structured material or structured surface and thus a scale with a measuring track. The structured material or structured surface need only be present in the working range of the sensors when in use and thus cover only a part of the measured object which then forms the scale. There are well-known methods of measurement that use for example light beams and sensors of suitable optical components to evaluate the determined periodic signals of e.g. paper, steel and plastic strips etc. in relative motion. German Patent Nos. DE 2 163 200 C2 and DE 2 133 942 C for example give an insight into this type of measurement method where the latter employs the appropriate correlation process to evaluate even non-determined and statistically fluctuating measured signals of e.g. moving metal strips.

Such measured objects are suitably determined either according to the properties of the material they are made of e.g. plastics, or their surfaces are finished by grinding or very finely turning to have the required structures for a suitable measuring track for evaluation, in the case of pistons for example. Published, Non-Prosecuted German Patent Application Nos. DE 34 18 854 A1 and DE 34 181 190 A1 describe lacquers and resist coatings where ultrasound is used to optically pre-structure and fix the desired structures into the material that are then also checked by measuring with ultrasound. Hence there is a wide range of physical methods of measurement (e.g. electromagnetic radiation, laser light, sound etc.) which use for example the surface of moving measuring bodies as a scale with a measuring track to evaluate the corresponding measured signals with suitable sensors.

The use of two separate sensors has the advantage that they may be employed as redundant sensors. In practice the single sensor or sensors in the use of two sensors mentioned may each form part of a multiple sensor configuration with parallel sensors.

In both cases, namely the use of only one sensor or the use of two sensors, the basic idea is that, when main power is lost, only the sensor function for recording i.e. counting the segments is maintained in a particularly energy-saving way using the auxiliary power supply. When running tests or after each reinstatement of the main supply it is appropriate to activate a safety circuit with logic which then selects the particular sensors according to the evaluation criteria of the function being used by the switch configuration. Passive redundancy is particularly recommended here as it has a lower energy consumption and the greater reliability of its components contributes to longer useful life of the measuring device. However, during main power operation, checking the segment counter with an additional segment counter using active redundancy of the existing second sensor is also recommended; this will allow the sensors to monitor each other as well as provide a check on the absolute segment counter via the total absolute value in the "safety circuit". This also makes it possible to switch over to the corresponding redundant sensor when there is a fault during main power operation. This generally ensures low-cost "single fault safety" required for personal safety and to avoid resultant damage in many industrial applications which would otherwise demand generally expensive and bulky multiple measuring systems.

The allocation of functions using main and auxiliary power, both for operation with one sensor and with a redundant sensor configuration was chosen so that the measured value evaluation unit can record the absolute encoded segments in auxiliary power mode using very low energy consumption of some 10 $\mu$A and guarantee safe battery operation of up to more than 10 years. This energy-saving method of recording segments has the advantage of allowing the use of both simple sensors e.g. with sin/cos signals as well as scales with e.g. simply produced N/S magnetic poles for magnetic absolute systems or with alternating light and dark scale divisions for example in optical absolute measuring systems.

For segments that are counted using magnetic poles, the permanent energy for signal conversion of the sensor signals may be used during relative motion. This is possible when using sensors for example that react to Hall or magneto-resistive effects so that their use is particularly beneficial from the point of view of a low auxiliary power requirement. However, it is possible to apply the basic idea for the configuration of the measuring device according to the invention regardless of the physical effect of the sensors used and it is also independent of the rendering of the auxiliary power.

In accordance with an added feature of the invention, the track has a first track for creating the first absolute value and a second track suitable for determining the second absolute value within the segment reached. The sensor configuration has only one sensor for evaluating both the first track for creating the first absolute value and the second track suitable for determining the second absolute value within the segment reached. Alternatively, the sensor configuration has at least two sensors. A first of the sensors evaluates the first track for creating the first absolute value and a second of the sensors evaluates the second track suitable for determining the absolute value within the segment reached.

In accordance with an additional feature of the invention, the sensor configuration has at least two sensors. A first of the sensors acts as a redundancy for a second of the sensors in each case.

In accordance with a further feature of the invention, an evaluation unit is connected to a comparator unit and the sensor configuration. The sensor configuration outputs signals from the sensors and the signals or parts of the signals useful for determining the absolute values of the segments are fed into the evaluation unit. The evaluation unit outputs calculated results for the segments from each of the sensors and the calculated results are compared in the comparator circuit and, if the calculated results vary, there is a switch over to only one of the sensors in the sensor configuration.

In accordance with a further feature of the invention, an evaluation circuit is provided, and if the auxiliary power mode is selected, the auxiliary voltage of the power supply is connected by the switch configuration to the sensor configuration and/or parts of the evaluation circuit required in the auxiliary power mode. In the auxiliary power mode, the switches of the switch configuration interrupt connections of the main voltage with the sensor configuration and/or at least one part of the evaluation circuit.

Other features which are considered as characteristic for the invention are set forth in the appended claims.

Although the invention is illustrated and described herein as embodied in a measuring system for recording angular and linear absolute values, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figures 1, 1A:
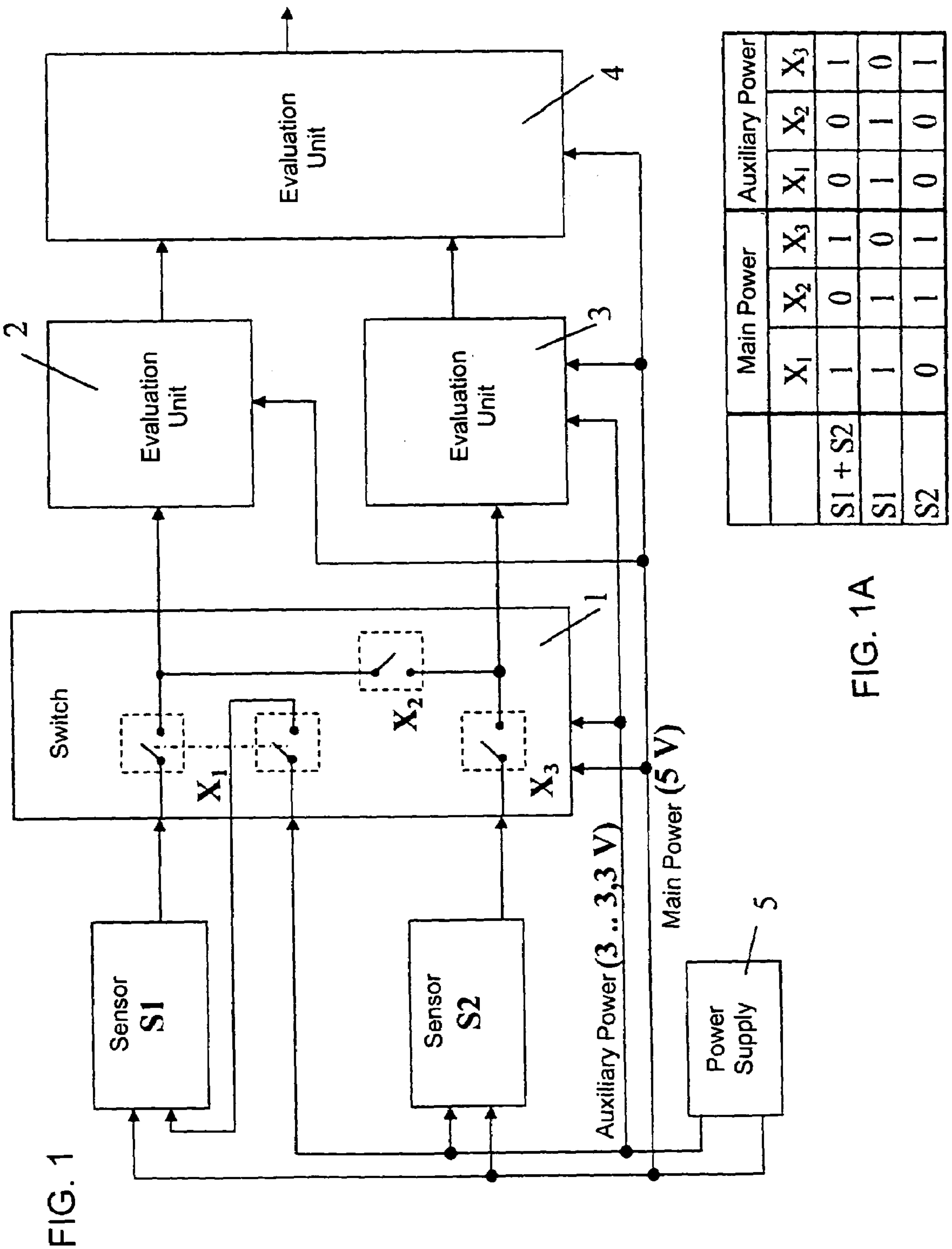
FIG. 1 is a block diagram of an example without redundancy according to the invention.
FIG. 1A is a table.

Referring now to the figures of the drawing in detail and first, particularly, to FIG. 1 thereof, there is shown sensors S1 and S2, which can be switched through to units 2 and 3 via a switch configuration 1 containing switches $X_1$ to $X_3$. An absolute value within a segment is recorded in evaluation unit 2, while in evaluation unit 3 the absolute value of the segments is counted. Evaluation unit 4 produces the total absolute value from these two absolute values. In addition there is a voltage supply unit 5 that normally supplies units S1, S2 and 1 to 4 with a main voltage of e.g. 5V. However, a second output of the voltage supply unit 5 supplies an auxiliary voltage of e.g. 3 to 3.3V.

In FIG. 1A there is a table showing the provision for cases where there are two sensors S1 and S2 present, there is only one sensor S1 or there is only one sensor S2.

For these three cases switch positions 1 (switch closed) or 0 (switch open) for switches $X_1$ to $X_3$ are indicated side-by-side for main power operation and auxiliary power operation. It is assumed here that, when using two sensors S1 and S2, sensor S1 provides signals that are used to calculate the absolute value within the segments. Sensor S2 is then used to calculate the absolute value of the segments. If only S1 or S2 is present, both absolute values must be able to be derived from the signals of either of these sensors.

The result of this is that, if both sensors are present, these will be connected to units 2 and 3 during main power operation for evaluation accordingly. In the auxiliary power mode only S2 is connected to the evaluation unit 3 for segment counting.

If only S1 is present it is usually connected to both evaluation units 2 and 3 via switches $X_1$ and $X_2$. This also applies in the auxiliary power mode where S1 is also connected to the auxiliary power supply via switch $X_1$ but the evaluation unit 2 does not have a supply. Therefore, only the segments are counted. Practically the same applies when using only sensor S2 during main power operation, that is $X_3$ and $X_2$ are closed. However, in the auxiliary power mode, only switch $X_3$ is closed which results in that here too only the segments are counted. In practice switches $X_1$ to $X_3$ are electronic switches, e.g. semiconductor switches.

The embodiment of FIG. 2 again shows sensors S1 and S2, a switching unit 1' and evaluation units 2', 3a and 3b, 4' and a main/auxiliary power unit 5'. In addition there is a logic circuit 6 which recognizes from its input signals when it is necessary to switch switches X in the switching unit 1'. The evaluation unit 2' is configured in such a way that it can both calculate from one sensor signal the absolute value within the segments from e.g. sin/cos signals, as well as recognize the number of segments from the zero crossings of the sin/cos signals and emit a corresponding counting signal via line 2b. Counting takes place in the evaluation unit 3b. Evaluation unit 3a is an upstream amplification unit. An additional unit 7 also contains an amplifier and segment counter. It is provided for reasons of redundancy.

In this case sensors S1 and S2 are sensors, from whose output signals both absolute values, that of the segments as well as of the position within the segment, can be derived.

Figures 2, 2A:
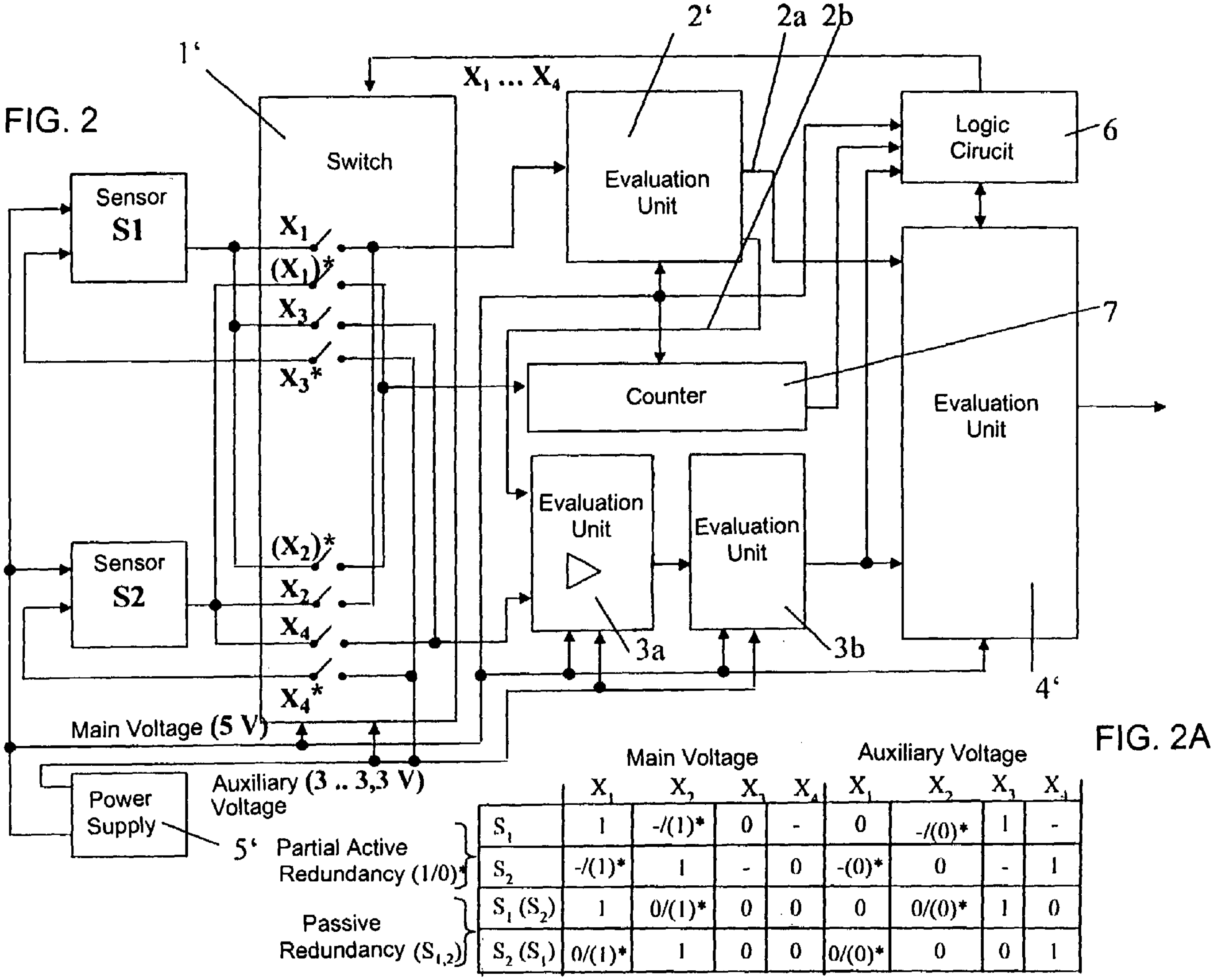
FIG. 2 is a block diagram showing possible redundant evaluation formats according to the invention.
FIG. 2A is a table.

FIG. 2 shows switches $X_1$ to $X_4$ as well as switches $(X_1)^*$ and $(X_2)^*$. The latter make it possible to switch to partially active redundancy and passive redundancy. With partially active redundancy continuous segment counting is undertaken by both sensors in parallel and compared in the logic circuit 6 functioning as a comparator 6. With passive redundancy the second sensor takes the place of the other when it is found to be faulty.

During normal operation (see table FIG. 2A), being the main voltage operating mode, either sensor S1 or S2 is connected in both cases via switch $X_1$, or $X_2$ to unit 2', which emits via its two outputs a signal along output 2a corresponding to the absolute value within the segment and to evaluation units 3a/3b along output 2b, when transfer to another segment has taken place, which is counted in unit 3b. If partially active redundancy is used and sensor S1 is switched through via switch $X_2$, sensor S1 is also connected to unit 7 via $X_2^*$ which results in that the segments are also counted in counter 7. The results of the two counts in units 3b and 7 are compared in safety unit 6. If they vary, there is a switch over to S2 meaning $X_2$ and $(X_1)^*$ are switched through and another comparison is made.

If the auxiliary power mode is required, S1 or S2 is connected via switched $X_3$ or $X_4$ to counter 3a and 3b. The result is counted in unit 3b or unit 4. In addition auxiliary power is supplied to sensors S1 or S2 via switches $X_3'$ or $X_4'$.

In the case of passive redundancy and if the sensor S1 is used as the main sensor, sensor S1 is connected to unit 2' via switch $X_1$. If the sensor S1 fails, redundant sensor S2 is connected via switch $X_2$ accordingly. The relevant switch over occurs if sensor S2 is the main sensor and sensor S1 the redundant sensor.

In the auxiliary power mode sensor S1 is connected to the counter 3a/3b via switch X3 in the first case and sensor S2 via $X_4$ in the second case. In addition, auxiliary power supply to sensors S1 and S2 is provided via switches $X_3^*$ or $X_4^*$.

Figures 3, 3A:
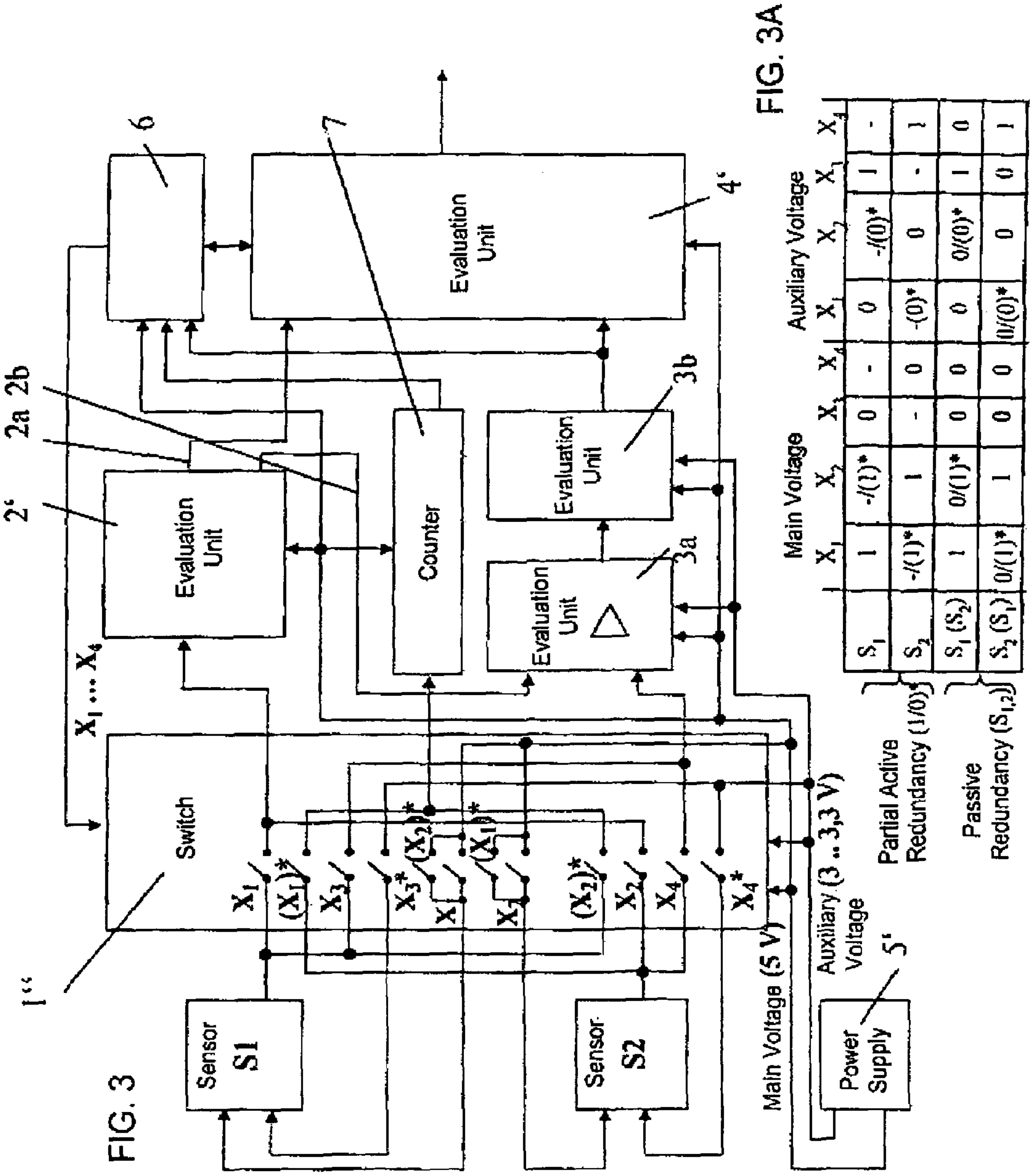
FIG. 3 is a block diagram showing a possible redundant evaluation format according to the invention.
FIG. 3A is a table.

FIGS. 3 and 3a only differ from FIGS. 2 and 2a in that further switches $X_1'$ and $X_2'$ or $X_1^{*\prime}$ and $X_2^{*\prime}$ of the switching unit 1" also allow main power to the sensors to be switched on or off.

This application claims the priority, under 35 U.S.C. § 119, of German patent application No. 103 12 045.9, filed Mar. 18, 2003; the entire disclosure of the prior application is herewith incorporated by reference.

I claim:

1. A measuring system, comprising:

a scale including at least two segments identically created for the generation of absolute values, each of said at least two segments having at least one track, said at least one track including a measurement track for generating a first absolute value of a position within said segments and at least one suitable track being at least one part of said at least one track for determining a second absolute value of the particular segment reached;

a sensor configuration for measuring and recording the absolute values of each of said segments reached;

an evaluation unit connected to said sensor configuration and providing a total absolute value for further processing, said total absolute value consisting of the first absolute value of the position within said segments and the second absolute value of the particular segment reached;

a power supply supplying a main voltage and an auxiliary voltage; and a switch configuration having switches connected to said power supply and switching through the auxiliary voltage when the main voltage fails in an auxiliary power mode and said sensor configuration being only used in the auxiliary power mode to determine an absolute value of the particular segment reached.

2. The measuring system according to claim 1, wherein:

said at least one track has a first track for creating the first absolute value and a second track suitable for determining the second absolute value; and said sensor configuration has only one sensor for evaluating both said first track for creating the first absolute value and said second track suitable for determining the second absolute value.

3. The measuring system according to claim 1, wherein:

said at least one track has a first track for creating the first absolute value and a second track suitable for determining the second absolute value; and said sensor configuration has at least two sensors, a first of said sensors evaluating said first track for creating the first absolute value and a second of said sensors evaluating said second track suitable for determining the second absolute value.

4. The measuring system according to claim 1, wherein said sensor configuration has at least two sensors, a first of said sensors acting as a redundancy for a second of said sensors in each case.

5. The measuring system according to claim 4, further comprising:

a comparator unit; and said evaluation unit being connected to said comparator unit and said sensor configuration, said sensor configuration outputting signals from said sensors and the signals or parts of the signals useful for determining the absolute values of said segments are ted into said evaluation unit, said evaluation unit outputting calculated results for said segments from each of said sensors and the calculated results are compared in said comparator circuit and, if the calculated results vary, there is a switch over to only one of said sensors in said sensor configuration.

6. The measuring system according to claim 1, further comprising an evaluation circuit, and if the auxiliary power mode is selected, the auxiliary voltage of said power supply is connected by said switch configuration to at least one of said sensor configuration and parts of said evaluation circuit required in the auxiliary power mode.

7. The measuring system according to claim 6, wherein if in the auxiliary power mode, said switch configuration having said switches interrupts connections of the main voltage, with at least one of said sensor configuration and at least one part of said evaluation circuit.

8. The measuring system according to claim 1, wherein the first absolute value and the second absolute value are linear values.

9. The measuring system according to claim 1, wherein the first absolute value and the second absolute value are angular values.

10. The measuring system according to claim 1, wherein:

said suitable track is at least one part of said measurement track; and said sensor configuration has only one sensor for evaluating both said measurement track for creating the first absolute value and said suitable track for determining the second absolute value.

11. The measuring system according to claim 1, wherein:

said suitable track is at least one part of said measurement track; and said sensor configuration has at least two sensors, a first of said sensors evaluating said measurement track for creating the first absolute value and a second of said sensors evaluating said suitable track for determining the second absolute value.

12. A measuring system, comprising:

a scale including at least two segments identically created for the generation of absolute values, each of said at least two segments having at least one track, said at least one track including a measurement track for generating a first absolute value of a position within said segments and at least one suitable track for determining a second absolute value of the particular segment reached, said scale being a structured material characteristic or a structured surface on a material;

a sensor configuration for measuring and recording the absolute values of each of said segments reached;

an evaluation unit connected to said sensor configuration and providing a total absolute value for further processing, said total absolute value consisting of the first absolute value of the position within said segments and the second absolute value of the particular segment reached;

a power supply supplying a main voltage and an auxiliary voltage; and a switch configuration having switches connected to said power supply and switching through the auxiliary voltage when the main voltage fails in an auxiliary power mode and said sensor configuration being only used in the auxiliary power mode to determine an absolute value of the particular segment reached.

13. The measuring system according to claim 12, wherein:

said at least one track has a first track for creating the first absolute value and a second track suitable for determining the second absolute value; and said sensor configuration has only one sensor for evaluating both said first track for creating the first absolute value and said second track suitable for determining the second absolute value.

14. The measuring system according to claim 12, wherein:

said at least one track has a first track for creating the first absolute value and a second track suitable for determining the second absolute value; and said sensor configuration has at least two sensors, a first of said sensors evaluating said first track for creating the first absolute value and a second of said sensors evaluating said second track suitable for determining the second absolute value.

15. The measuring system according to claim 12, wherein:

said suitable track is at least one part of said measurement track; and said sensor configuration has only one sensor for evaluating both said measurement track for creating the first absolute value and said suitable track for determining the second absolute value.

16. The measuring system according to claim 12, wherein:

said suitable track is at least one part of said measurement track; and said sensor configuration has at least two sensors, a first of said sensors evaluating said measurement track for creating the first absolute value and a second of said sensors evaluating said suitable track for determining the second absolute value.

* * * * *